US008601505B2

(12) United States Patent (10) Patent No.: US 8,601,505 B2
Ho (45) Date of Patent: Dec. 3, 2013

(54) APPARATUSES FOR GLOBAL TELEVISION (TV) CHANNEL SHARING

(75) Inventor: Hsien-Chen Ho, Taipei County (TW)

(73) Assignee: Lite-On Technology Corporation, Taipei (TW)

( * ) Notice: Subject to any disclaimer, the term of this patent is extended or adjusted under 35 U.S.C. 154(b) by 1724 days.

(21) Appl. No.: 11/808,196

(22) Filed: Jun. 7, 2007

(65) Prior Publication Data

US 2008/0253444 A1 Oct. 16, 2008

(30) Foreign Application Priority Data

Apr. 11, 2007 (TW) .............................. 96112679 A (51) Int. Cl.
*H04N 7/15* (2006.01)
*H04N 21/63* (2011.01)
(52) U.S. Cl.
CPC .................................. *H04N 21/632* (2013.01)
USPC .................. 725/23; 725/29; 725/95
(58) Field of Classification Search
USPC ......................................................... 725/105
See application file for complete search history.

(56) References Cited

U.S. PATENT DOCUMENTS

| 7,027,460 | B2* | 4/2006 | Iyer et al. ...................... 370/429 |
| 7,639,156 | B2* | 12/2009 | Kuijlaars ....................... 340/4.3 |
| 2005/0005300 | A1* | 1/2005 | Putterman et al. .............. 725/89 |

FOREIGN PATENT DOCUMENTS

CN 1768335 A 5/2006

OTHER PUBLICATIONS

Golle, Philippe et al. Incentive s for Sharing in Peer-to-Peer Networks. 2001. WELCOM '01 Proceedings of the Second International Workshop on Electronic Commerce.*

* cited by examiner

*Primary Examiner* — Bennett Ingvoldstad (57) ABSTRACT

An apparatus for global television (TV) channel sharing, operating as a sharing client, comprises a registration module, a TV signal receiving module, a multimedia data encoding module, and an Internet communication module. The registration module receives a network address of a subscription client from a mediation server. The TV signal receives module receiving local TV signals after receiving the network address of the subscription client. The multimedia data encoding module encodes the local TV signals into a bitstream. The Internet communication module transmits the bitstream to the subscription client corresponding to the network address via the Internet.

17 Claims, 10 Drawing Sheets

APPARATUSES FOR GLOBAL TELEVISION (TV) CHANNEL SHARING

BACKGROUND

The invention relates to peer-to-peer (P2P) information sharing, and more particularly, to systems and methods for global television (TV) channel sharing.

P2P TV is a system for transmitting TV content over a P2P network. P2P TV may be used to download videos or share live TV content between users. The P2P TV system, however, requires a fair sharing mechanism to encourage more users to share live TV content.

SUMMARY

Apparatuses for global television (TV) channel sharing are provided. An embodiment of an apparatus for global television (TV) channel sharing, operating as a sharing client, comprises a registration module, a TV signal receiving module, a multimedia data encoding module, and an Internet communication module. The registration module receives a network address of a subscription client from a mediation server. The TV signal receiving module receives local TV signals after receiving the network address of the subscription client. The multimedia data encoding module encodes the local TV signals into a bitstream. The Internet communication module transmits the bitstream to the subscription client corresponding to the network address via the Internet.

An embodiment of an apparatus for global TV channel sharing, operating as a subscription client, comprises a subscription request module, an Internet communication module, a multimedia data decoding module, and a TV content player device. The subscription request module issues a subscription request with a TV program/channel and a subscription period to a mediation server. The Internet communication module receives a bitstream comprising TV program content of the TV program/channel during the subscription period from a sharing client via the Internet. The multimedia data decoding module decodes the bitstream into multimedia data. The TV content player device plays the multimedia data. Where, a sharing score of the subscription client stored in the mediation server exceeds a lower limit.

An embodiment of an apparatus for global TV channel sharing, operating as a mediation server, comprises a subscription request verification module. The subscription request verification module receives a subscription request with a subscription TV program/channel and a subscription period from a subscription client, determines whether a sharing score of the subscription client exceeds a lower limit, detects a sharing client providing TV program content of the subscription TV program/channel during the subscription period when the sharing score of the subscription client exceeds the lower limit, and notifies the sharing client of transmission of the TV program content of the subscription TV program/channel to the subscription client.

BRIEF DESCRIPTION OF DRAWINGS

The invention will become more fully understood by referring to the following detailed description with reference to the accompanying drawings, wherein.

DETAILED DESCRIPTION

Figure 1:
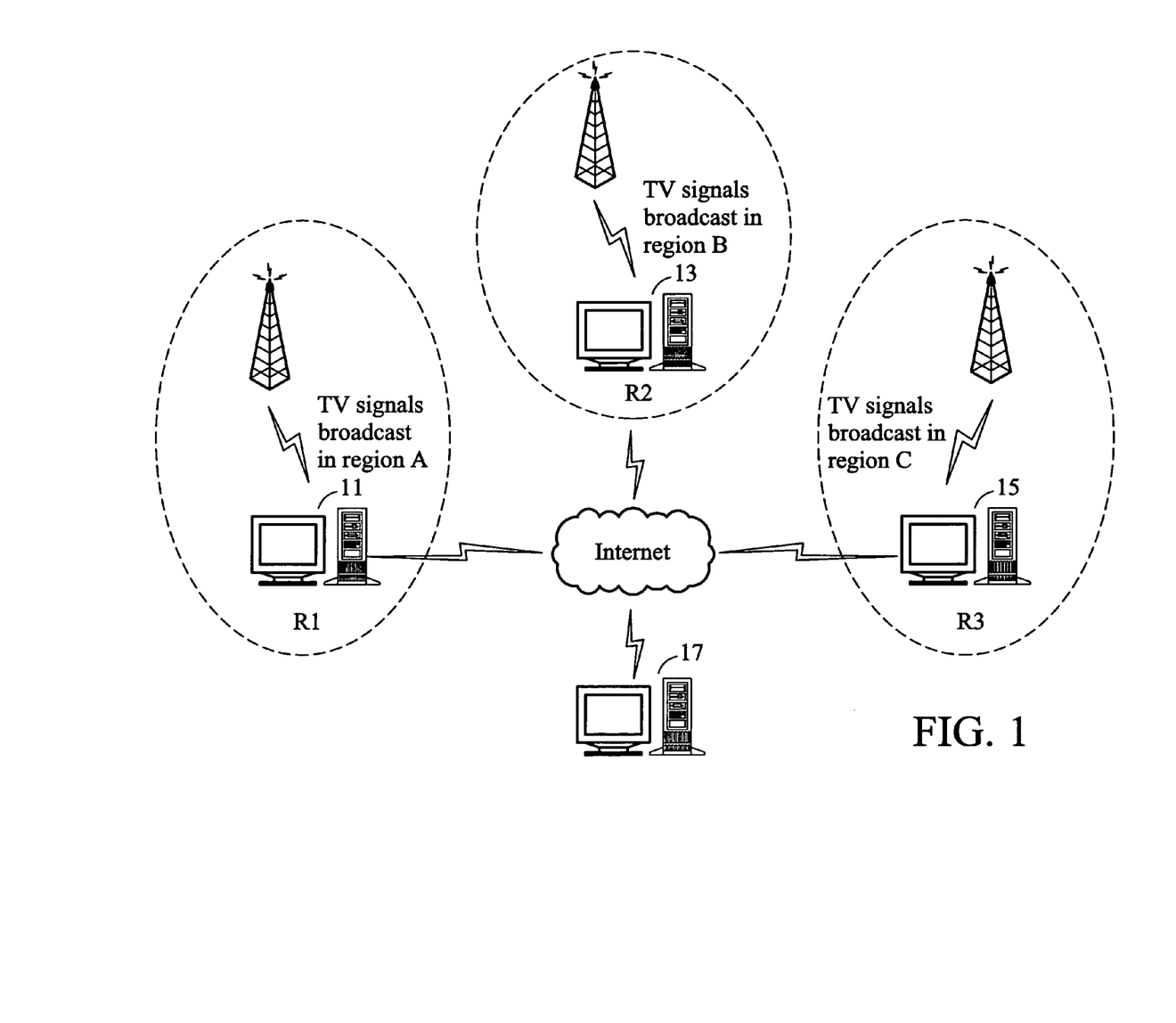
FIG. 1 is a diagram of network architecture of an embodiment of a global television (TV) channel sharing system.

FIG. 1 is a diagram of network architecture of an embodiment of a global television (TV) channel sharing system, comprising personal computers 11, 13, 15, and 17. The personal computers 11, 13, 15, and 17 operate in and are connected by a wired or wireless network or a combination thereof via the Internet. Those skilled in the art will recognize that personal computers 11, 13, 15, and 17 may be connected in different types of networking environments, and may communicate therebetween through various types of transmission devices such as routers, gateways, access points, base station systems or others. Wherein, the personal computers 11, 13, and 15 operate as sharing clients and subscription clients for live TV content. One of the personal computers 11, 13, and 15 respectively receives local TV content corresponding to regions R1, R2, and R3. Regions R1, R2, and R3 represent different geographic zones, for example, region R1 represents America, region R2 represents Taiwan, and region R3 represents Japan. A personal computer located in one region may only receive local live TV content, but receive live TV content of other regions via satellite, radio, or TV cables. The live TV content may be transmitted to the personal computers 11, 13, and 15 via various analog or digital signals. The analog signals may conform to the NTSC (National Television Standards Committee), PAL (Phase Alternating Line), or SECAM (Séquentiel couleur à mémoire) system, or others. The digital signals may conform to the DVB-T (Digital Video Broadcasting-Terrestrial), -S (-Sattellite), or -H (-Handheld) system, or others. One of the personal computers 11, 13, and 15 encodes received real TV content into a bitstream, such as MPEG-2, MPEG-4, H.26x, or others, segments, encapsulates the bitstream into a series of network packets, and subsequently transmits the network packets to others in a P2P manner via the Internet. The personal computer 17 operating as a mediation server, calculates sharing scores of personal computer 11, 13, and 15 by monitoring TV sharing behavior therebetween, and mediates personal computers located in different geographic zones according to their sharing scores, enabling the mediated personal computers to proceed live TV content sharing.

Figure 2:
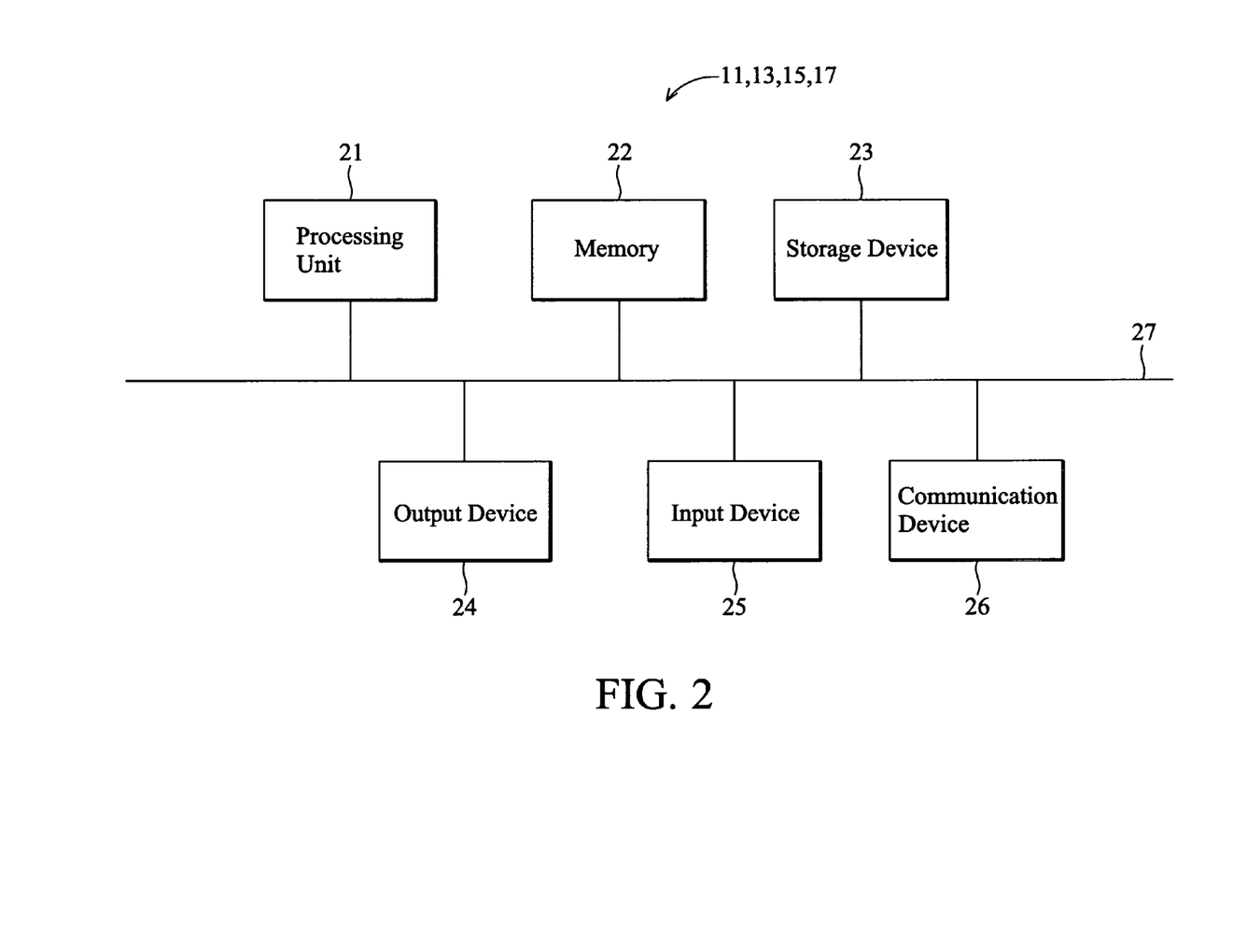
FIG. 2 is a diagram of a hardware environment applicable to an embodiment of a personal computer.

FIG. 2 is a diagram of a hardware environment applicable to an embodiment of personal computer 11, 13, 15, or 17, comprising a processing unit 21, memory 22, a storage device 23, an output device 24, an input device 25 and a communication device 26. The processing unit 21 is connected by buses 27 to the memory 22, storage device 23, output device 24, input device 25 and communication device 26. Moreover, those skilled in the art will understand that some embodiments may be practiced with other computer system configurations, including multiprocessor-based, microprocessor-based or programmable consumer electronics, network PCs, minicomputers, mainframe computers, and the like. Wherein, the microprocessor-based or programmable consumer electronics may comprise mobile phones, PDAs (personal digital assistant), digital AV player, or others. There may be one or more processing units 21, such that the processor of the computer comprises a single central processing unit (CPU), a microprocessing unit (MPU) or multiple processing units, commonly referred to as a parallel processing environment. The memory 22 is preferably a random access memory (RAM), but may also include read-only memory (ROM) or flash ROM. The memory 22 preferably stores program modules executed by the processing unit 21 to perform global TV channel sharing. Generally, program modules include routines, programs, objects, components, or others, that perform particular tasks or implement particular abstract data types. Some embodiments may also be practiced in distributed computing environments where tasks are performed by remote processing devices linked through a communication network. In a distributed computing environment, program modules may be located in both local and remote memory storage devices based on various remote access architectures such as DCOM, CORBA, Web objects, Web Services or similar.

The entire operation of global TV channel sharing may be conceptually divided into three phases: sharing registration; subscription request; and sharing maintenance. In the sharing registration phase, when a client (such as one of the personal computers 11, 13, and 15) decides to share received local TV program content with other clients, the client may issue a registration request with its network address (such as its IP address, MAC address, or others), identifier, and other client profile data, as well as, sharing TV channels/programs, sharing time periods, and other channel profile data, to a server (such as the personal computer 17). For example, a client located in America may issue a registration request to the server, indicating that the client wishes to share American TV program content. When receiving the registration request, the server stores registration information in a database for subsequent mediation tasks.

In the subscription request phase, when a client (such as one of the personal computers 11, 13, and 15) wishes to subscribe to remote TV program content, the client may issue a subscription request with its network address (such as its IP address, MAC address, or others), identifier, authentication data, and other client profile data, as well as, subscribing TV channels/programs, subscribing time periods, and other subscribing profile data, to the server. For example, a client located in Taiwan may issue a subscription request indicating that the client wishes to subscribe American TV program content to the server. When receiving the subscription request, the server verifies provided authentication data, determines whether a relevant client is presented in response to the subscription information (i.e. a client has registered TV channels/programs satisfying the subscription request), and determines whether information regarding the presented client is provided to the subscription client according to the sharing score thereof, enabling the subscription client to proceed with subsequent acquisition of the requesting TV program content. The client providing local TV program content may be referred to as a sharing client. The client subscribing remote TV program content may be referred to as a subscription client. The server may be referred to as a mediation server.

In the sharing maintenance phase, when beginning transmission of local TV program content to the subscription client, the sharing client transmits a sharing notification to the mediation server. When receiving the sharing notification, the mediation server activates a sharing score maintenance mechanism for periodically (for example, every minute, every five minutes, and similar) increasing a sharing score of the sharing client, and decreasing a sharing score of the subscription client. In addition, the mediation server periodically inspects whether the sharing score of the subscription client is lower than a lower limit, and, if so, issues a suspend sharing request to the sharing client in order to stop TV program content transmission to the subscription client.

Figure 3:
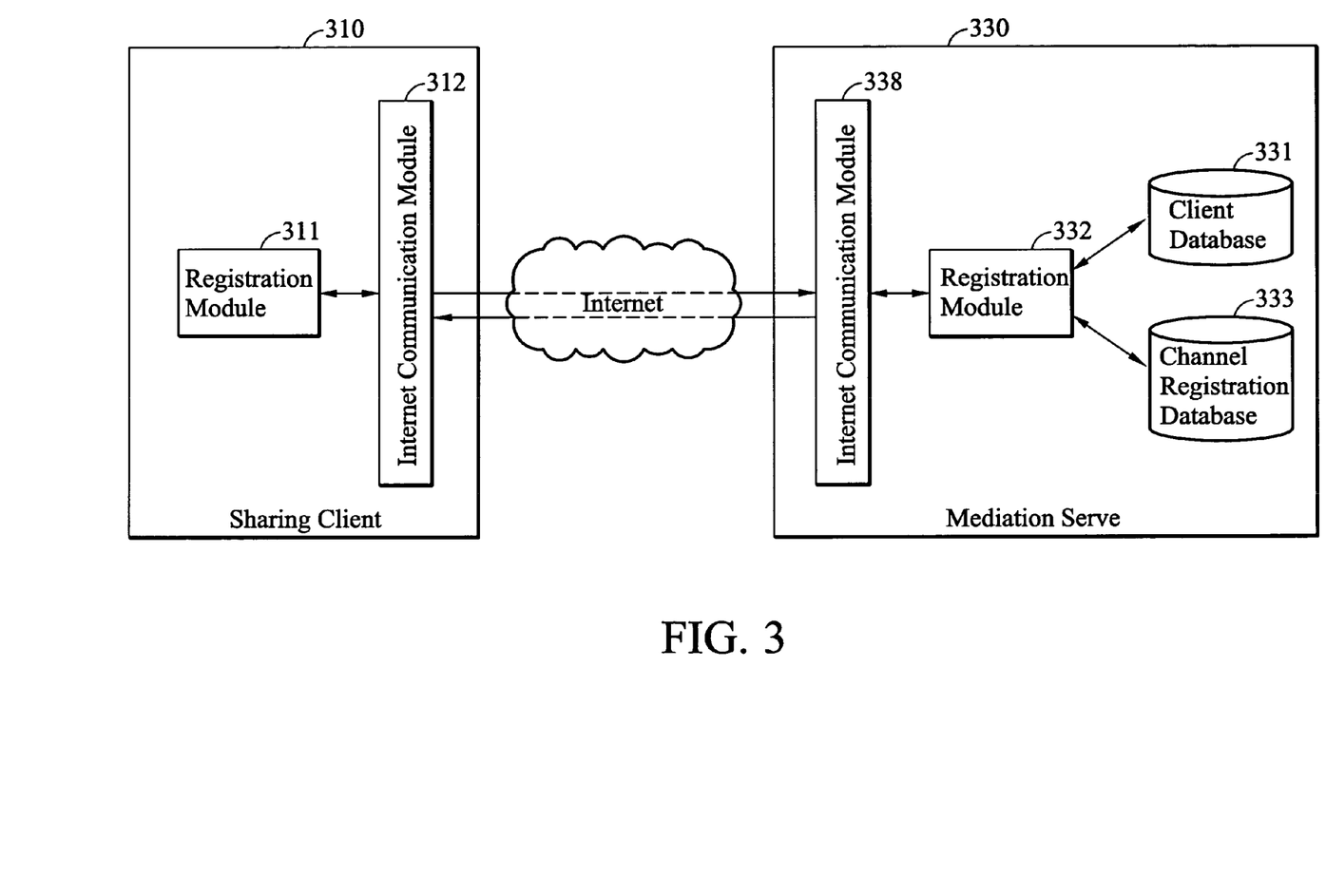
FIG. 3 is a diagram of an embodiment of a global TV channel sharing system applied in a sharing registration phase.

FIG. 3 is a diagram of an embodiment of a global TV channel sharing system applied in the sharing registration phase, comprising the sharing client 310 and the mediation server 330. The sharing client 310 comprises a registration module 311 and an Internet communication module 312. The mediation server 330 comprises a client database 331, a channel registration database 333, a registration module 332 and an Internet communication module 338. The registration module 311 may provide a graphical user interface (GUI) to facilitate input of a client identifier (such as a nickname), or other client profile data, sharing TV channels/programs, sharing time periods, and other channel profile data, and issues a registration request with its network address and the input information to the mediation server 330. The Internet communication module 312 encapsulates the registration request with the sharing client network address and the input information into at least one network packet in a format recognized by the mediation server 330, and transmits the network packet to the Internet communication module 338 of the mediation server 330. When receiving the network packet of the registration request via the Internet communication module 338, the registration module 332 of the mediation server 330 acquires the sharing client network address, the nickname and other sharing client profile data from the network packet, and stores the acquired data in the client database 331. The registration module 332 further acquires shared TV channels/programs, sharing time periods, and other channel profile data from the network packet, and stores the acquired data in the channel registration database 333.

Figure 4:
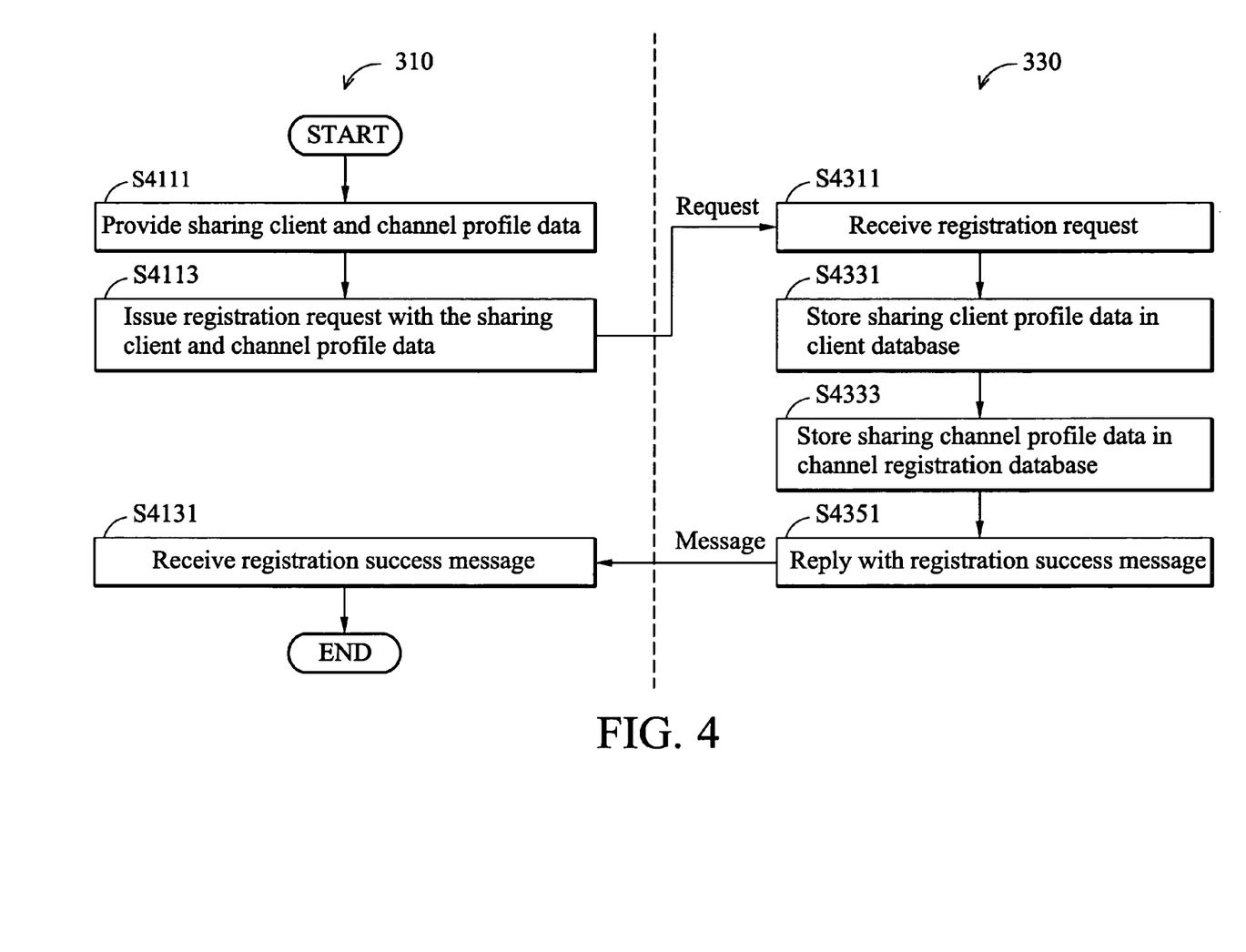
FIG. 4 is a flowchart illustrating an embodiment of a method for global TV channel sharing applied in the sharing registration phase.

With reference to the FIG. 3, FIG. 4 is a flowchart illustrating an embodiment of a method for global TV channel sharing applied in the sharing registration phase, divided into two sections, a left section showing steps performed by the sharing client 310, and a right section showing steps performed by the mediation server 330, separated by dashed lines for added clarity. In step S4111, sharing client and channel profile data is provided by the sharing client 310. The sharing client data comprises sharing a client network address, identifier (such as nickname), and the similar. The sharing channel data comprises sharing TV channel/program numbers, sharing time periods, and similar. In step S4113, a registration request with the sharing client and channel profile data is issued to the mediation server 330. In step S4311, the registration request is received by the mediation server 330. In step S4331, the sharing client profile data is stored in the client database 331. In step S4333, the sharing channel profile data is stored in the channel registration database 333. In step S4351, the mediation server 330 replies to the sharing client 310 with a registration success message indicating that the registration request has been successfully processed. In step S4131, the registration success message is received by the sharing client 310.

Figure 5:
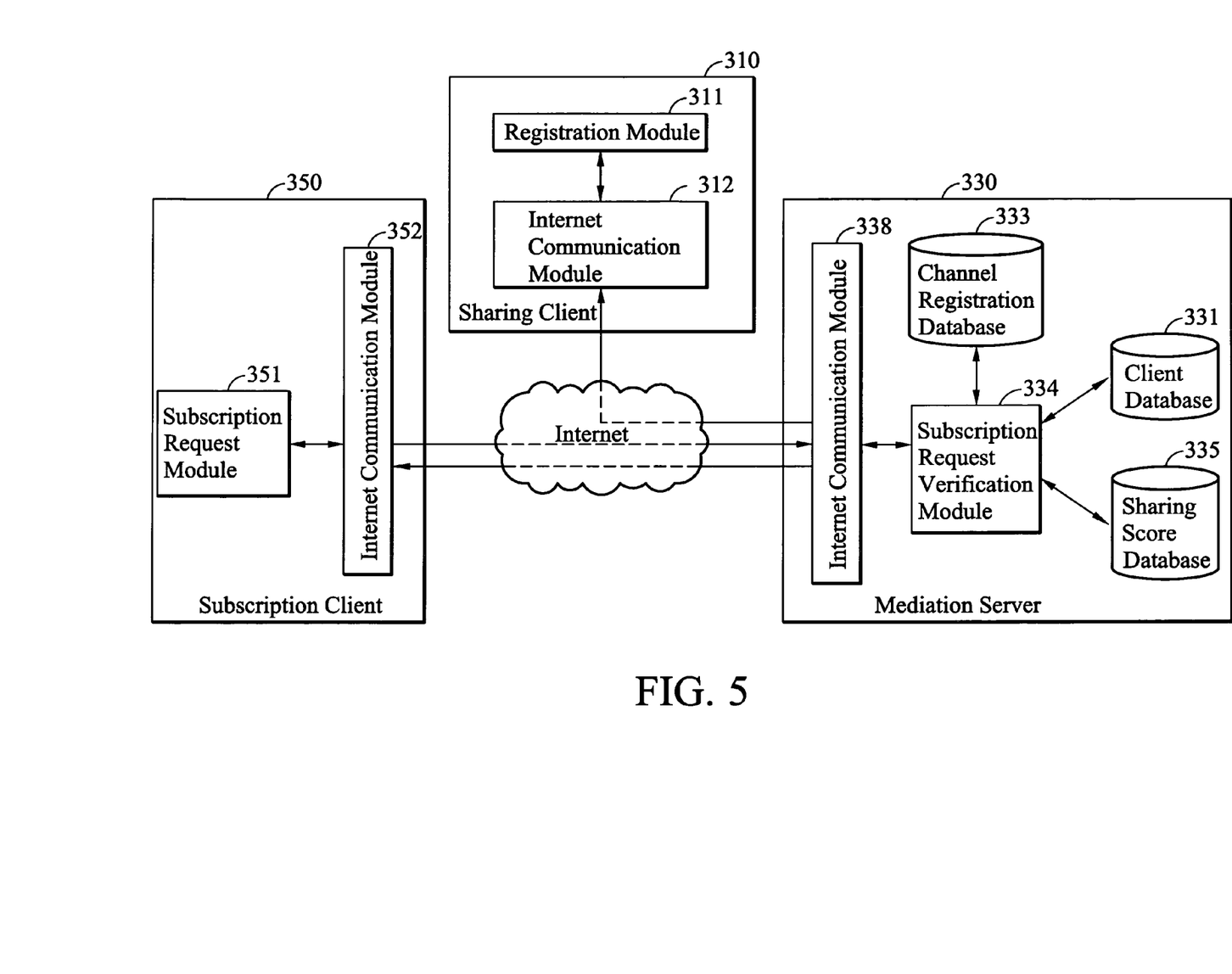
FIG. 5 is a diagram of an embodiment of a global TV channel sharing system applied in the subscription request phase.

FIG. 5 is a diagram of an embodiment of a global TV channel sharing system applied in the subscription request phase, comprising the subscription client 350, the sharing client 310 and the mediation server 330. The subscription client 350 comprises a subscription request module 351 and an Internet communication module 352. The sharing client 310 comprises a registration module 311 and an Internet communication module 312. The mediation server 330 comprises a client database 331, a channel registration database 333, a sharing score database 335, a subscription request verification module 334, and an Internet communication module 338. The subscription request module 351 may provide a graphical user interface (GUI) to facilitate input of a client identifier (such as a nickname), or other client profile data, subscription TV channels/programs, subscription periods, and other subscription profile data, and issues a subscription request with its network address and the input information to the mediation server 330 via the Internet communication module 352. The Internet communication module 352 encapsulates the registration request with the subscription client network address and the input information into at least one network packet in a format recognized by the mediation server 330, and transmits the network packet to the Internet communication module 338 of the mediation server 330. When receiving the network packet of the subscription request via the Internet communication module 338, the subscription request verification module 334 of the mediation server 330 acquires the verification data from the network packet, and determines whether the acquired verification data is authenticated. If not, the subscription request verification module 334 replies to the subscription client 350 with a network packet comprising a subscription deny message via the Internet communication module 338, indicating that the provided user account or password thereof is incorrect. For example, it is determined whether a user account of the verification data is a valid account (i.e. whether the user account thereof is present in the client database 331), and a password thereof is correct (i.e. whether the password thereof is the same as a recorded password for the user account of the client database 331), and, if so, it is determined that the verification data is authenticated. The subscription request verification module 334 acquires the subscription profile data from the network packet, and determines whether at least one sharing client satisfying the subscription request is detected. If not, the subscription request verification module 334 replies to the subscription client 350 with a network packet comprising an insufficient sharing client message indicating that any sharing client satisfying the subscription request is not detected via the Internet communication module 338. For example, it is determined whether any registered sharing client desiring to provide content of the requested TV program/channel during the requested time period is detected by retrieving the channel registration database 333. If so, it is determined that at least one sharing client satisfying the subscription request is detected. The subscription request verification module 334 further determines whether the subscription client has a sufficient sharing score by retrieving the sharing score database 335. If so, the subscription request verification module 334 notifies the registration module 311 of the sharing client 310 satisfying the subscription request via the Internet communication module 338 of profile data of the subscription client 350, enabling the sharing client 310 to transmit designated TV program content to the subscription client 350. If not, the subscription request verification module 334 replies to the subscription client 350 with a network packet carrying an insufficient sharing score message. The message indicating that the sharing score of the subscription client 350 is insufficient is delivered via the Internet communication module 338. Note that, in some embodiments, those skilled in the art may practice sharing scores of clients in the client database 331 instead of the independent sharing score database 335.

Figure 6A:
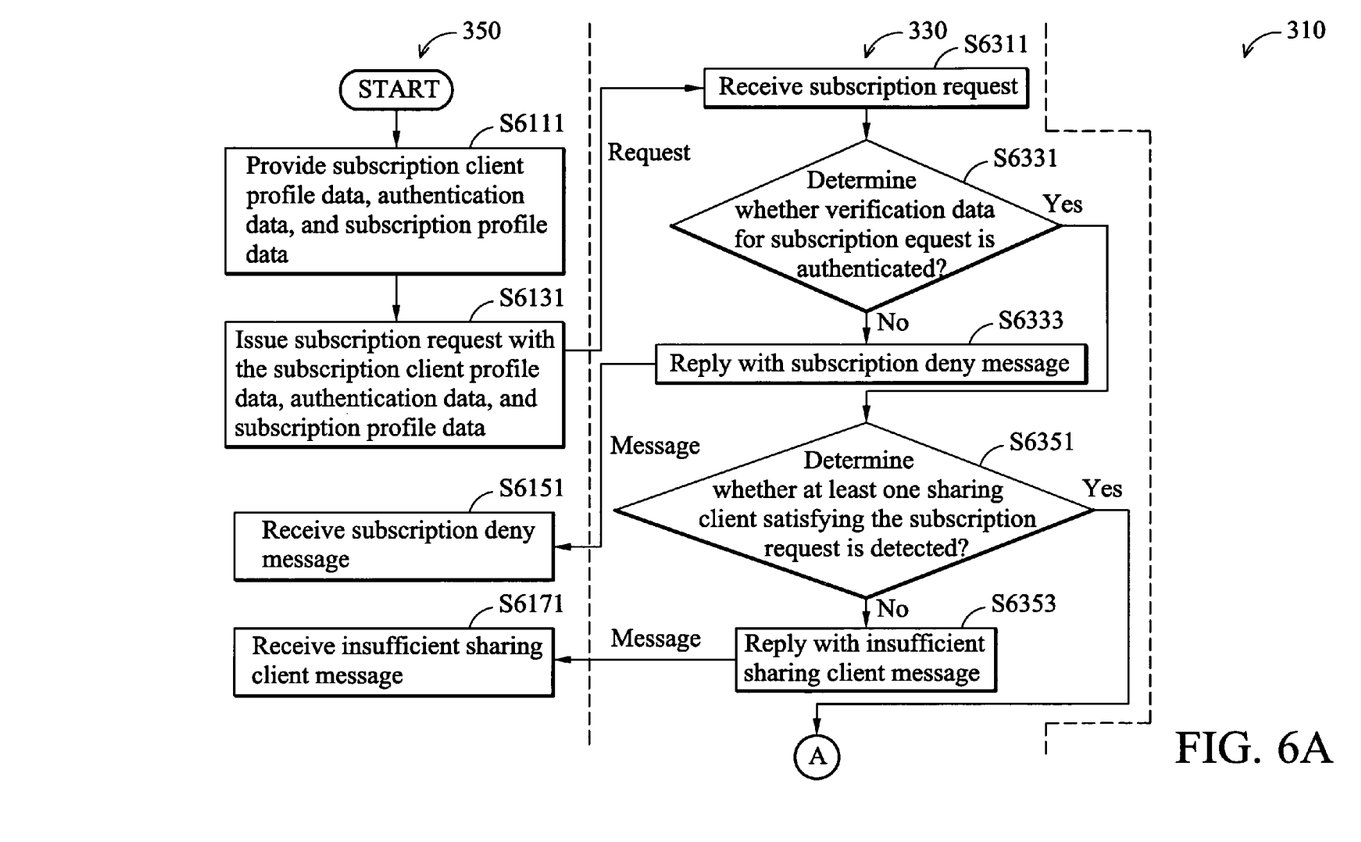
FIGS. 6A and 6B are flowcharts illustrating an embodiment of a method for global TV channel sharing applied in the subscription request phase.
Figure 6B:
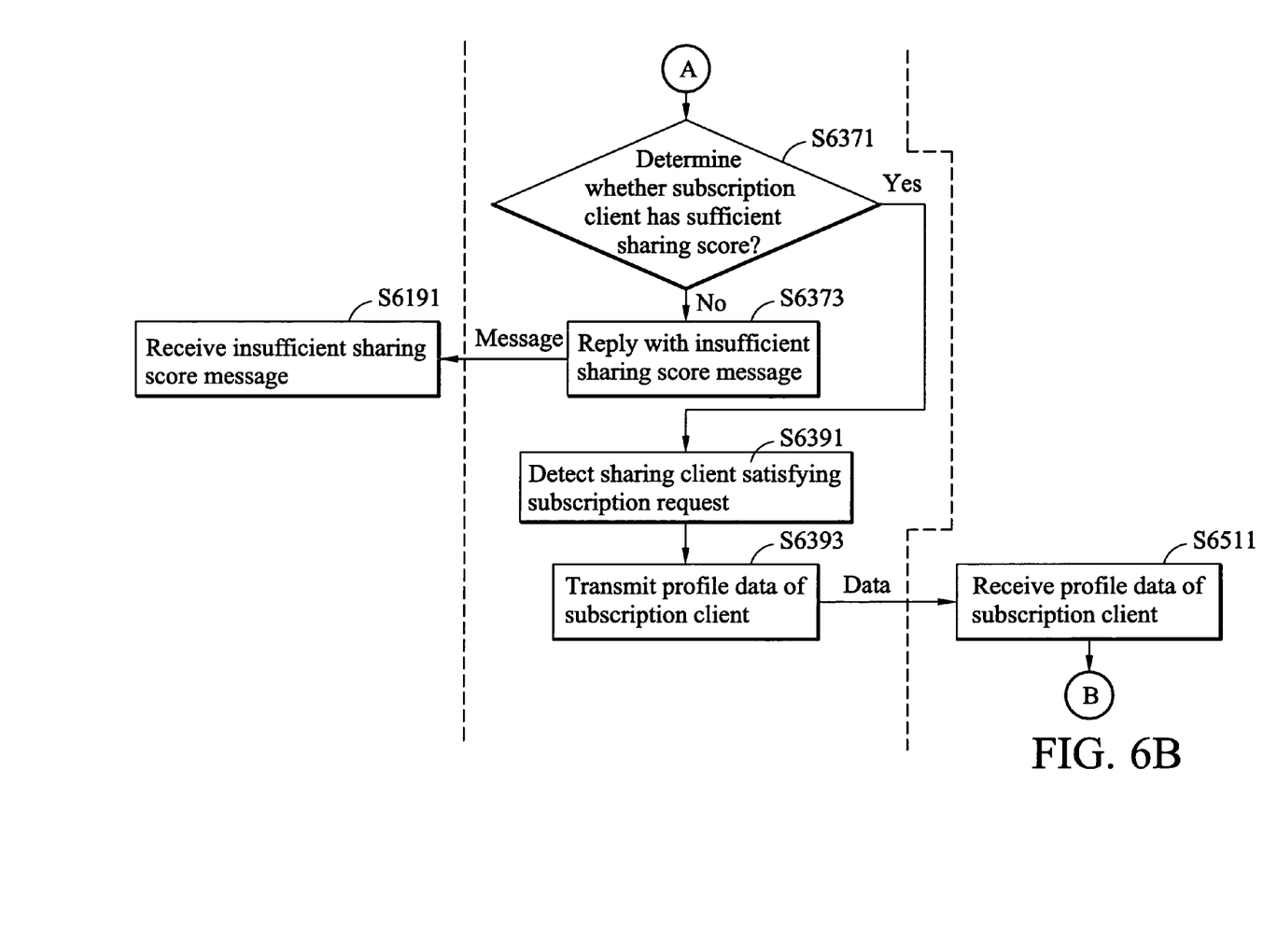

FIGS. 6A and 6B are flowcharts illustrating an embodiment of a method for global TV channel sharing applied in the subscription request phase, divided into three sections, a left section showing steps performed by the subscription client 350, a middle section showing steps performed by the mediation server 330, and a right section showing steps performed by the sharing client 310, separated by dashed lines for added clarity. In step S6111, the subscription client 350 provides the described subscription client profile data, authentication data, and subscription profile data. In step S6131, a subscription request with the subscription client profile data, authentication data, and subscription profile data is issued to the mediation server 330. In step S6311, the mediation server 330 receives the subscription request. In step S6331, the mediation server 330 determines whether the verification data for the subscription request is authenticated. If so, the process proceeds to step S6351, otherwise, to step S6333. In step S6333, the mediation server 330 replies to the subscription client 350 with a subscription deny message. In step S6351, the mediation server 330 determines whether at least one sharing client satisfying the subscription request is detected. If so, the process proceeds to step S6371, otherwise, to step S6353. In step S6353, the mediation server 330 replies to the subscription client 350 with an insufficient sharing client message. In step S6371, the mediation server 330 determines whether the subscription client has a sufficient sharing score. If so, the process proceeds to step S6391, otherwise, to step S6373. The sharing score of a subscription client represents a duration for which the subscription client previously shared local TV program content with other clients, with a higher sharing score representing a longer duration. In step S6373, the mediation server 330 replies to the subscription client 350 with an insufficient sharing score message. In step S6391, a sharing client satisfying the subscription request is detected by comparing the subscription profile data with the content of the channel registration database 333. If the sharing client 310 satisfies the subscription request, in step S6393, profile data of the subscription client 350 is transmitted to the detected sharing client 310, enabling the sharing client 310 to transmit designated TV program content to the subscription client 350. In some embodiments, the order of steps S6351 and S6371 may be exchanged.

In some embodiments of the registration and subscription request phases, referring to step S4111 of FIG. 4, channel profile data provided by the sharing client 310 may contain a local TV system (a satellite or a cable TV system) identifier, and/or a program/channel list during the sharing time period, instead of a particular sharing TV program/channel number, and/or a particular TV program/channel name. Referring to step S6111 of FIG. 6A, the subscription client 350 may determine a particular TV program/channel with reference to the provided program/channel list.

Figure 7:
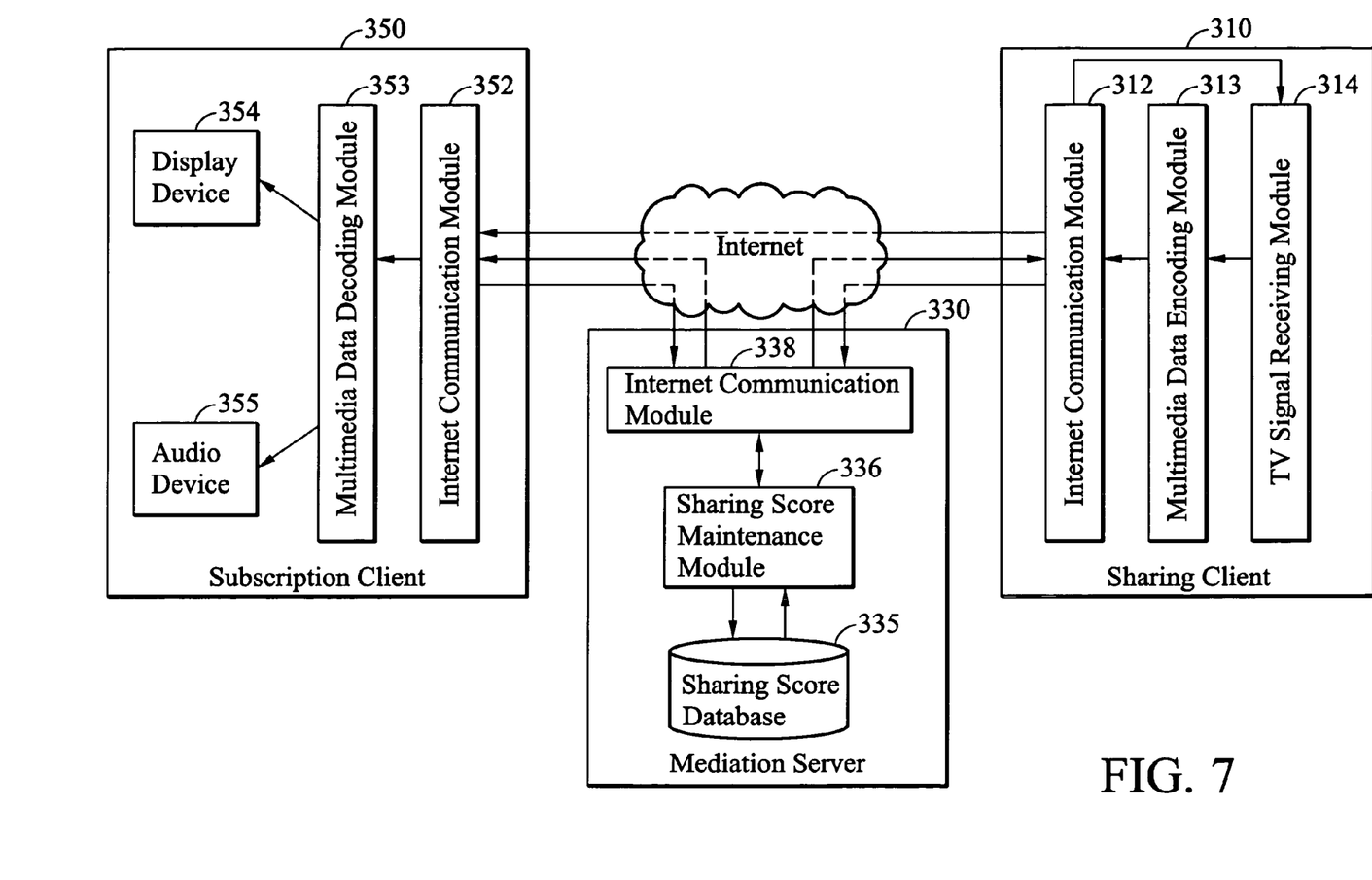
FIG. 7 is a diagram of an embodiment of a global TV channel sharing system applied in the sharing maintenance phase.

FIG. 7 is a diagram of an embodiment of a global TV channel sharing system applied in the sharing maintenance phase, comprising the sharing client 310, subscription client 350, and the mediation server 330. The sharing client 310 comprises a TV signal receiving module 314, a multimedia data encoding module 313 and the Internet communication module 312. The subscription module 350 comprises the Internet communication module 352, a multimedia data decoding module 353, a display device 354 and an audio device 355. The mediation server 330 comprises the sharing score database 335, a sharing score maintenance module 336 and the Internet communication module 338. After the sharing client 310 receives the network address of the subscription client 350, the TV signal receiving module 314 receives analog or digital TV signals and acquires designated TV program content (comprising video, audio, and/or teletext data) therefrom. The multimedia data encoding module 313 then encodes the acquired TV program content into a bitstream, such as a MPEG-2, MPEG-4, or H.264 bitstream, and transmits the encoded bitstream to the subscription client 350 via the Internet communication module 312. Note that, the acquired TV program content is broadcast during the subscription period. After starting transmission of the encoded bitstream to the subscription client 350, the sharing client 310 further transmits a sharing notification to the mediation server via the Internet communication module 312, enabling the mediation server 330 to activate a sharing score maintenance mechanism. The Internet communication module 312 encapsulates the encoded bitstream into at least one network packet, and transmits the network packet to the Internet communication module 352 of the subscription client 350. The Internet communication module 312 further encapsulates the sharing notification into at least one network packet, and transmits the network packet to the Internet communication module 338 of the mediation server 330. The multimedia data decoding module 353 receives a bitstream via the Internet communication module 352, decodes the received bitstream, displays the decoded video and teletext data via the display device 354, and plays the decoded audio data via the audio device 355. After receiving the sharing notification via the Internet communication module 338, the sharing score maintenance module 336 periodically (for example, every minute, every five minutes, and similar) increases the sharing score of the sharing client 310, and reduces the sharing score of the subscription client 350. The sharing score maintenance module 336 further periodically inspects whether the sharing score of the subscription client 350 is lower than a lower limit, and, if so, issues a suspend sharing request to the sharing client 310, resulting in the sharing client 310 to stop transmission of TV program content to the subscription client 350.

Figure 8A:
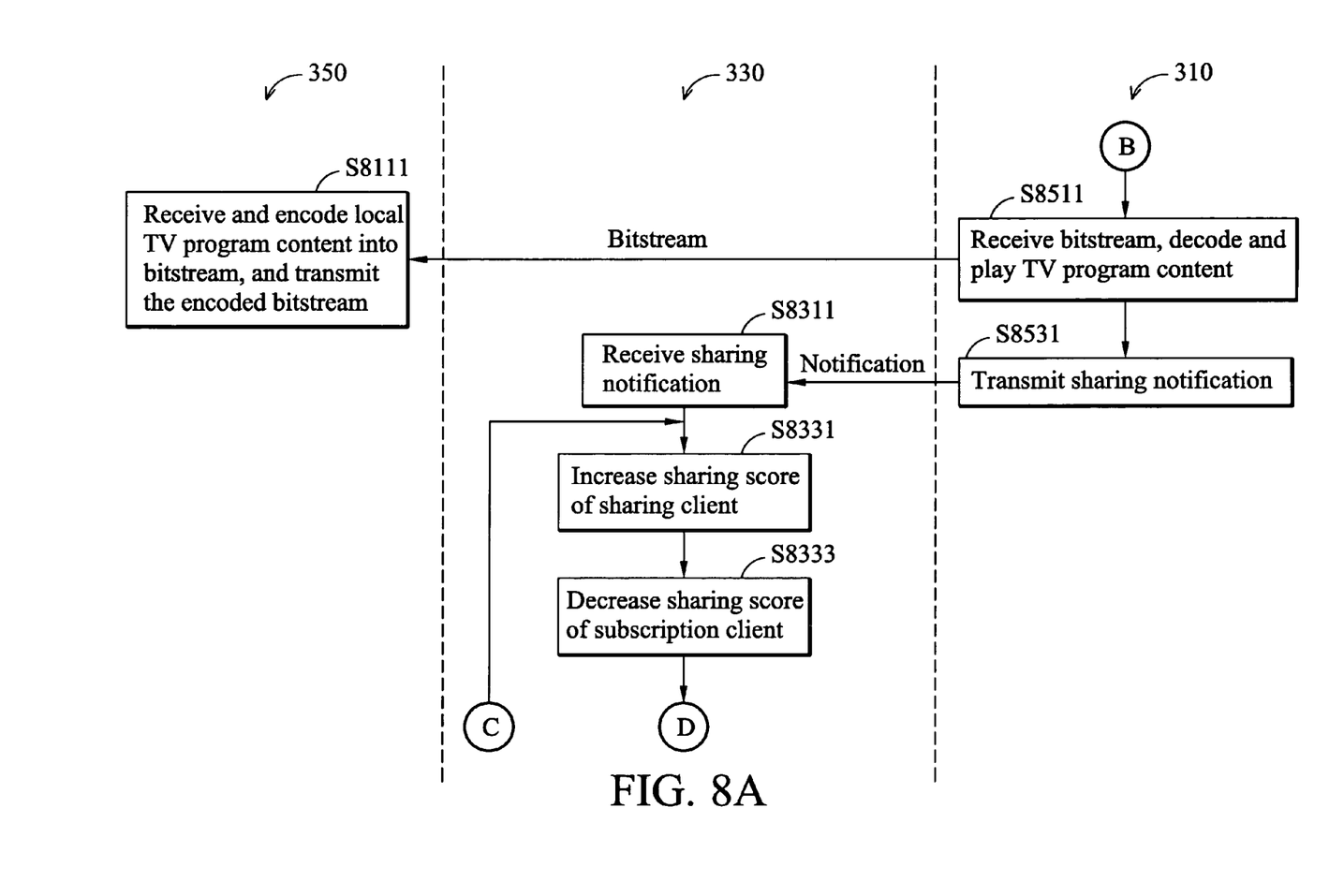
FIGS. 8A and 8B are flowcharts illustrating an embodiment of a method for global TV channel sharing applied in the sharing maintenance phase.
Figure 8B:
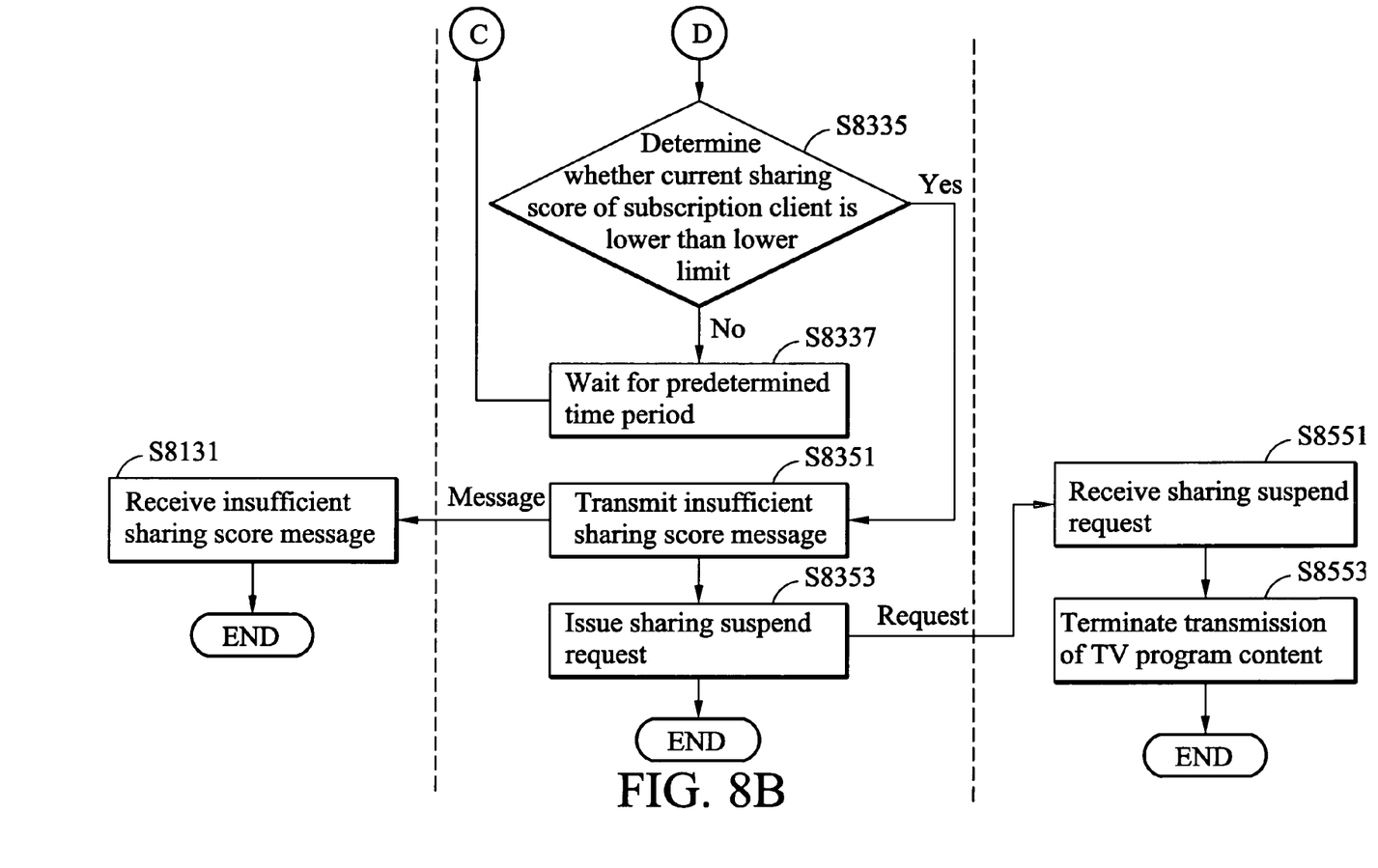

With reference to the FIG. 7, FIGS. 8A and 8B are flowcharts illustrating an embodiment of a method for global TV channel sharing applied in the sharing maintenance phase, divided into three sections, a left section showing steps performed by the subscription client 350, a middle section showing steps performed by the mediation server 330, and a right section showing steps performed by the sharing client 310, separated by dashed lines for added clarity. After receiving the network address of the subscription client 350 (as shown in step S6511 of FIG. 6B), in step S8511, the sharing client 310 receives and encodes local TV program content into a bitstream, and transmits the encoded bitstream to the subscription client 350. In step S8111, the subscription client 350 receives the bitstream, decodes and plays the TV program content. In step S8531, the sharing client 310 transmits a sharing notification to notify the mediation server 330 of the start of transmission of the designated TV program content to the subscription client 350. In step S8311, the mediation server 330 receives the sharing notification. Subsequently, the mediation server 330 repeats a loop comprising steps S8311 to S8337 to periodically increase the sharing score of the sharing client 310, decrease the sharing score of the subscription client 350, and inspect whether the sharing score of the subscription client 350 is lower than a lower limit. In step S8331, the mediation server 330 increases the sharing score of the sharing client 310, and stores the increased sharing score in the sharing score database 336. In step S8333, the mediation server 330 decreases the sharing score of the subscription client 350, and stores the decreased sharing score in the sharing score database 336. In step S8335, the mediation server 330 determines whether the current sharing score of the subscription client 350 is lower than a lower limit. If so, the process proceeds to step S8351, otherwise, to step S8337. After waiting for a predetermined time period as shown in step S8337, the mediation server 330 continues to perform step S8331. In step S8351, the mediation server 330 transmits an insufficient sharing score message to the subscription client 350. In step S8353, the mediation server 330 issues a sharing suspend request to the sharing client 310. In step S8551, the sharing client 310 receives the sharing suspend request. In step S8553, the sharing client 310 terminates transmission of TV program content. Note that, when desiring to suspend reception of TV program content, the subscription clients 350 may issue a suspend reception request to the mediation server 330, to stop the mediation server 330 performing the loop comprising steps S8331 to S8337, and further issues a suspend reception request to the sharing client 310, resulting in the sharing client 310 to terminate the transmission of TV program content.

In some embodiments of the sharing maintenance phase, the mediation server 330 may omit step S8331 of FIG. 8A, and, once detecting that a start time of a sharing time period registered by the sharing client 310 is reached, periodically performing another loop to increase the sharing score of the sharing client 310 until detecting that an end time of the sharing time period is reached.

Systems and methods, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer system and the like, the machine becomes an apparatus for practicing the invention. The disclosed methods and apparatuses may also be embodied in the form of program code transmitted over some transmission medium, such as electrical wiring or cabling, through fiber optics, or via any other form of transmission, wherein, when the program code is received and loaded into and executed by a machine, such as a computer or an optical storage device, the machine becomes an apparatus for practicing the invention. When implemented on a general-purpose processor, the program code combines with the processor to provide a unique apparatus that operates analogously to specific logic circuits.

Certain terms are used throughout the description and claims to refer to particular system components. Those skilled in the art will appreciate that consumer electronic equipment manufacturers may refer to a component by different names. This document does not intend to distinguish between components that differ in name but not function.

Although the invention has been described in terms of preferred embodiment, it is not limited thereto. Those skilled in this technology can make various alterations and modifications without departing from the scope and spirit of the invention. Therefore, the scope of the invention shall be defined and protected by the following claims and their equivalents.

What is claimed is:

1. An apparatus for global television (TV) channel sharing, operating as a sharing client, comprising:
   a registration module receiving a network address of a subscription client from a mediation server;
   a TV signal receiving module receiving local TV signals comprising live local TV program content after receiving the network address of the subscription client;
   a multimedia data encoding module encoding the local TV signals into a bitstream; and an Internet communication module transmitting the bitstream to the subscription client corresponding to the network address via the Internet, wherein the registration module issues a registration request with a TV program/channel and a sharing time period to the mediation server, the sharing time period defining a start time and an end time between which live local TV program content of the TV program/channel is made available to the subscription client when a sharing score of the subscription client stored in the mediation server exceeds a lower limit, the sharing score of the subscription client representing a duration of time during which the subscription client previously shared live local TV program content with other clients, with a higher sharing score representing a longer duration.

2. The apparatus as claimed in claim 1 wherein the Internet communication module encapsulates the registration request into at least one network packet, and transmits the network packet to the mediation server.

3. The apparatus as claimed in claim 1 wherein the registration module provides a graphical user interface facilitating input of the TV program/channel and the sharing time period by a user.

4. The apparatus as claimed in claim 1 wherein the Internet communication module encapsulates the bitstream into at least one network packet, and transmits the network packet to the subscription client.

5. An apparatus for global television (TV) channel sharing, operating as a subscription client, comprising:

a subscription request module issuing a subscription request with a TV program/channel and a subscription period to a mediation server;

an Internet communication module receiving a bitstream comprising live local TV program content of the TV program/channel during the subscription period from a sharing client via the Internet, wherein the subscription period satisfies a sharing time period registered by the sharing client;

a multimedia data decoding module decoding the bitstream into multimedia data; and a TV content player device playing the multimedia data, wherein the sharing time period defines a start time and an end time between which live local TV program content of the TV program/channel is made available to the subscription client when a sharing score of the subscription client stored in the mediation server exceeds a lower limit, the sharing score of the subscription client representing a duration of time during which the subscription client previously shared live local TV program content with other clients, with a higher sharing score representing a longer duration.

6. The apparatus as claimed in claim 5 wherein the subscription request module provides a graphical user interface facilitating input of the TV program/channel and the subscription period by a user.

7. An apparatus for global television (TV) channel sharing, operating as a mediation server, comprising:

a subscription request verification module receiving a subscription request with a subscription TV program/channel and a subscription period from a subscription client, determining whether a sharing score of the subscription client exceeds a lower limit, detecting a sharing client providing live local TV program content of the subscription TV program/channel during the subscription period when the sharing score of the subscription client exceeds the lower limit, wherein the subscription period satisfies a sharing time period registered by the sharing client, and notifying the sharing client of transmission of the live local TV program content of the subscription TV program/channel to the subscription client, wherein the sharing time period defines a start time and an end time between which live local TV program content of the TV program/channel is made available to the subscription client and the sharing score of the subscription client represents a duration of time during which the subscription client previously shared live local TV program content with other clients, with a higher sharing score representing a longer duration.

8. The apparatus as claimed in claim 7 wherein the subscription request verification module replies to the subscription client with an insufficient sharing score message when the sharing score of the subscription client is lower than the lower limit.

9. The apparatus as claimed in claim 7 further comprising:

a sharing score maintenance module periodically increasing a sharing score of the sharing client and decreasing the sharing score of the subscription client after the sharing client starts transmission of the live local TV program content of the subscription TV program/channel to the subscription client.

10. The apparatus as claimed in claim 9 further comprising a sharing score database storing the updated sharing scores of the sharing and subscription clients.

11. The apparatus as claimed in claim 9 wherein the sharing score maintenance module periodically inspects whether the sharing score of the subscription client is lower than the lower limit after starting transmission of the live local TV program content of the subscription TV program/channel to the subscription client, and issues a sharing suspend request to the sharing client if the inspection determines that the sharing score of the subscription client is lower than the lower limit, resulting in that transmission of the live local TV program content of the subscription TV program/channel to the subscription client is terminated.

12. The apparatus as claimed in claim 7 wherein the subscription request comprises a network address of the subscription client, and the subscription request verification module transmits the network address of the subscription client to the sharing client, enabling the sharing client to transmit the live local TV program content of the subscription TV program/channel to the subscription client according to the network address thereof.

13. The apparatus as claimed in claim 7 wherein the subscription request comprises verification data, and the subscription request verification module determines whether the verification data is authenticated, and detects the sharing client providing live local TV program content of the subscription TV program/channel during the subscription period when the verification data is authenticated.

14. The apparatus as claimed in claim 13 wherein the subscription request verification module replies to the subscription client with a subscription deny message when the verification data is not authenticated.

15. The apparatus as claimed in claim 7 wherein the subscription request verification module determines whether any sharing client satisfying the subscription request is present, and detects the sharing client providing live local TV program content of the subscription TV program/channel during the subscription period when one sharing client satisfying the subscription request is present.

16. The apparatus as claimed in claim 15 wherein the subscription request verification module replies to the subscription client with an insufficient sharing client message when determining no sharing clients satisfying the subscription request are present.

17. The apparatus as claimed in claim 7 further comprising a channel registration database storing information regarding that the sharing client can provide the live local TV program content of the subscription TV program/channel during the subscription period.

* * * * *